(No Model.)  4 Sheets—Sheet 1.

J. R. ROSE.
APPARATUS FOR THE MANUFACTURE OF GAS.

No. 506,077. Patented Oct. 3, 1893.

(No Model.) 4 Sheets—Sheet 3.

J. R. ROSE.
APPARATUS FOR THE MANUFACTURE OF GAS.

No. 506,077. Patented Oct. 3, 1893.

Witnesses
John C. Wilson
Percy C. Bowen

Inventor
J. R. Rose,
by Whitman & Wilkinson
Attorneys.

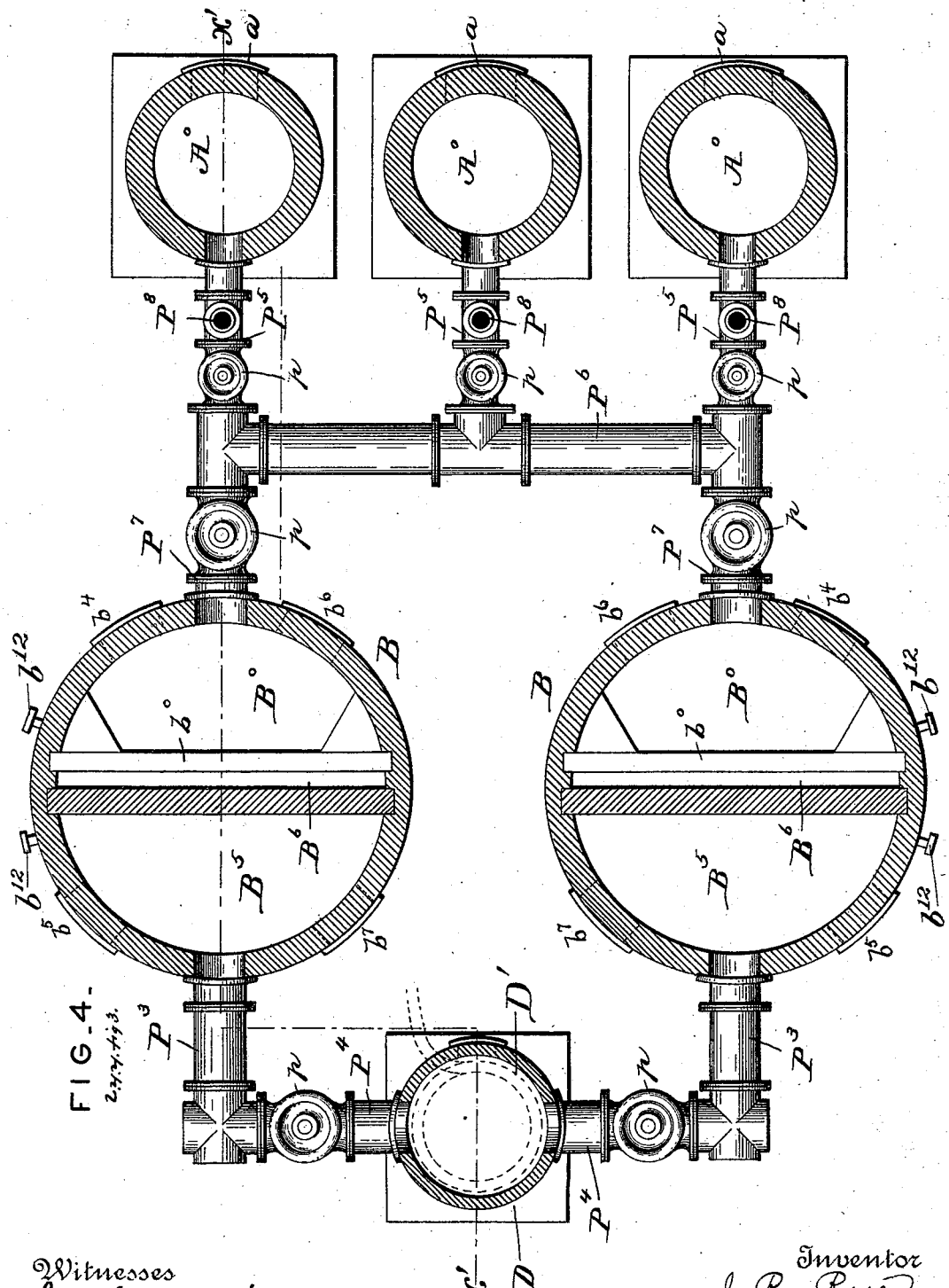
(No Model.) 4 Sheets—Sheet 4.
J. R. ROSE.
APPARATUS FOR THE MANUFACTURE OF GAS.
No. 506,077. Patented Oct. 3, 1893.

UNITED STATES PATENT OFFICE.

JAMES REUBEN ROSE, OF ALLEGHENY, ASSIGNOR OF ONE-HALF TO J. THORPE POTTS, OF PHILADELPHIA, PENNSYLVANIA.

APPARATUS FOR THE MANUFACTURE OF GAS.

SPECIFICATION forming part of Letters Patent No. 506,077, dated October 3, 1893.

Application filed February 6, 1893. Serial No. 461,184. (No model.)

*To all whom it may concern:*

Be it known that I, JAMES REUBEN ROSE, a citizen of the United States, residing at Allegheny, in the county of Allegheny and State of Pennsylvania, have invented certain new and useful Improvements in Processes of and Apparatus for Manufacturing Gas; and I do hereby declare the following to be a full, clear, and exact description of the invention, such as will enable others skilled in the art to which it appertains to make and use the same.

My invention relates to improvements in apparatus for the manufacture of fuel and illuminating gas, and it consists of certain novel features hereinafter described and claimed.

Reference is had to the accompanying drawings, in which corresponding parts are indicated by similar letters throughout the several views.

Figure 1:
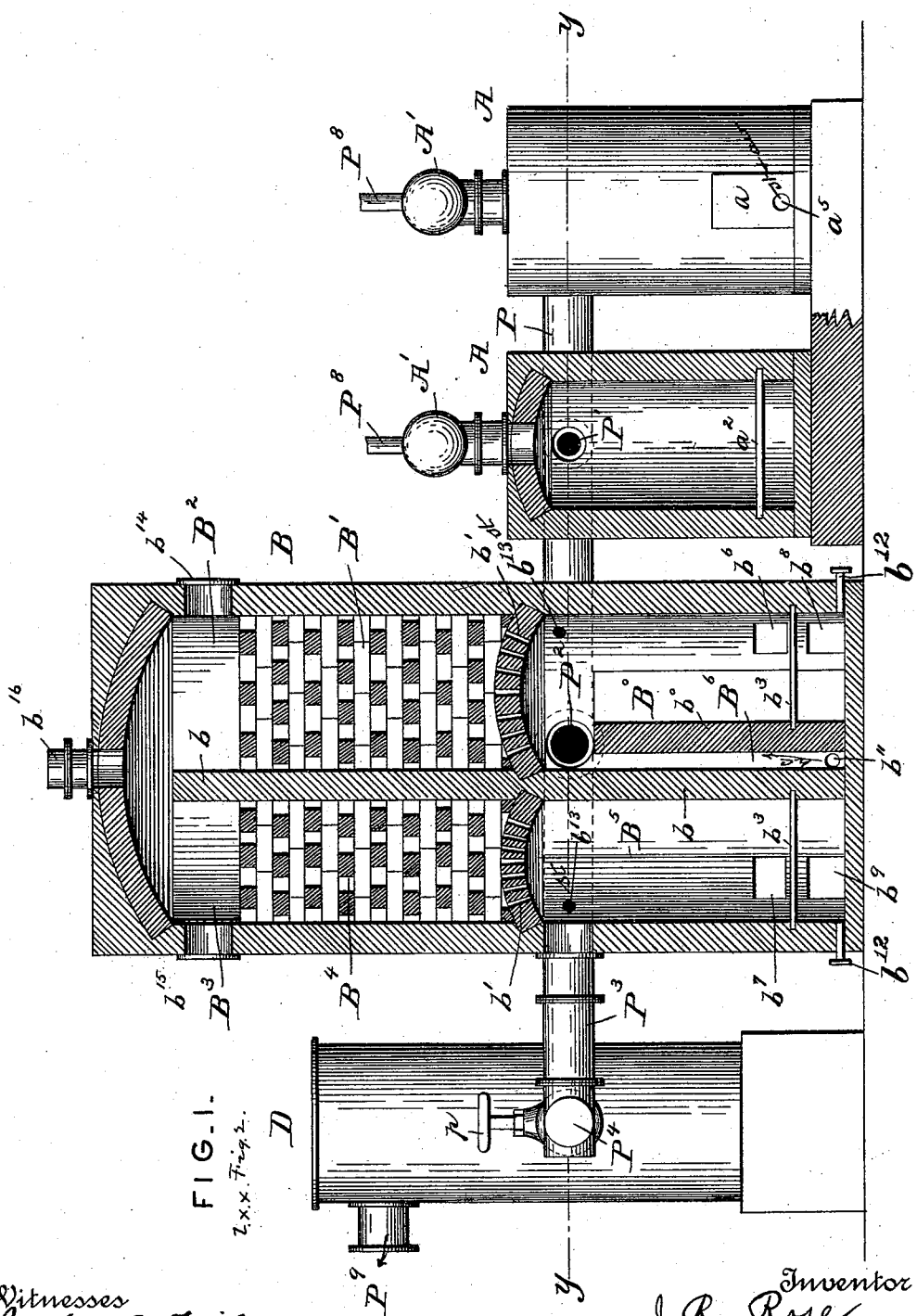
Figure 2:
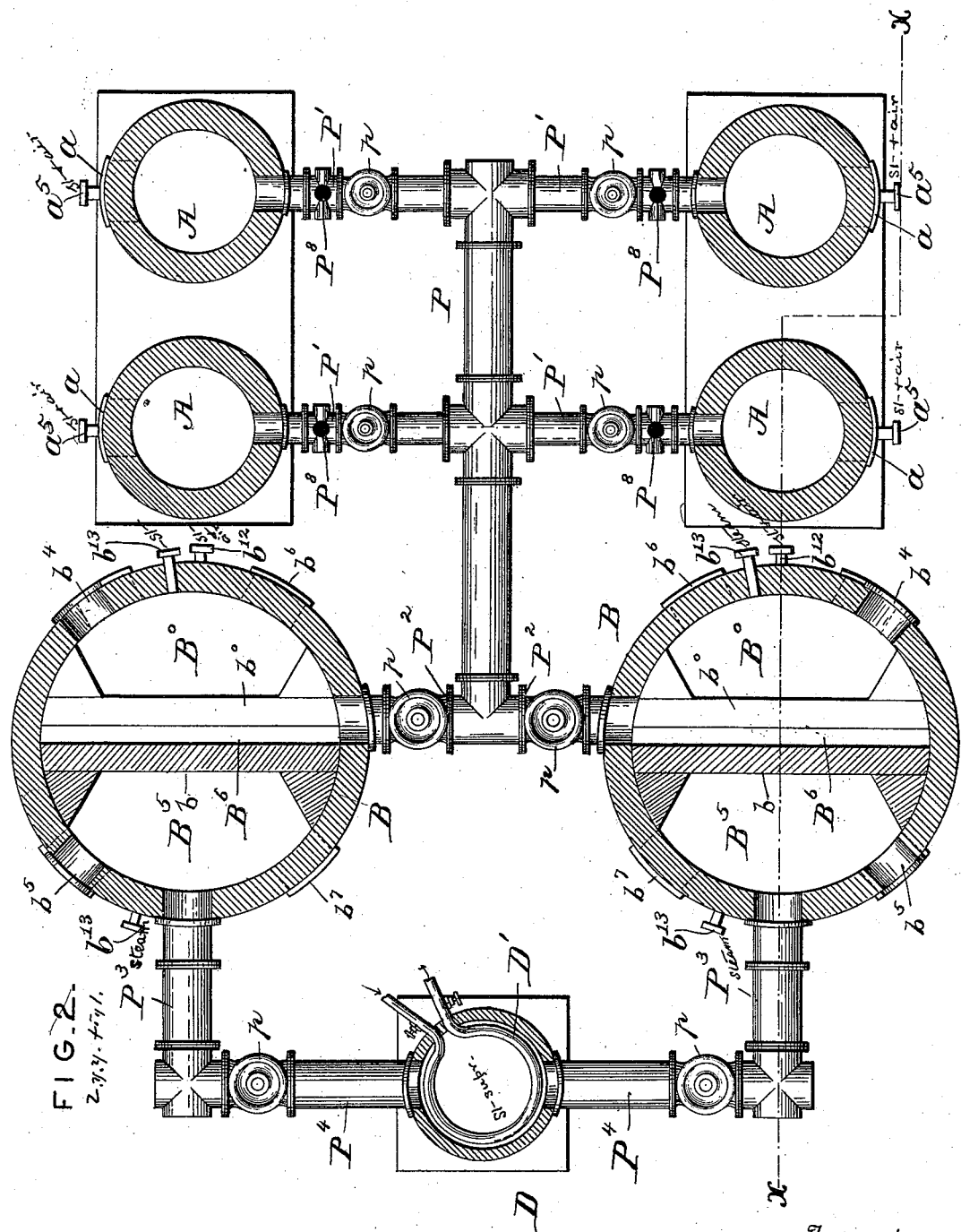
Figure 3:
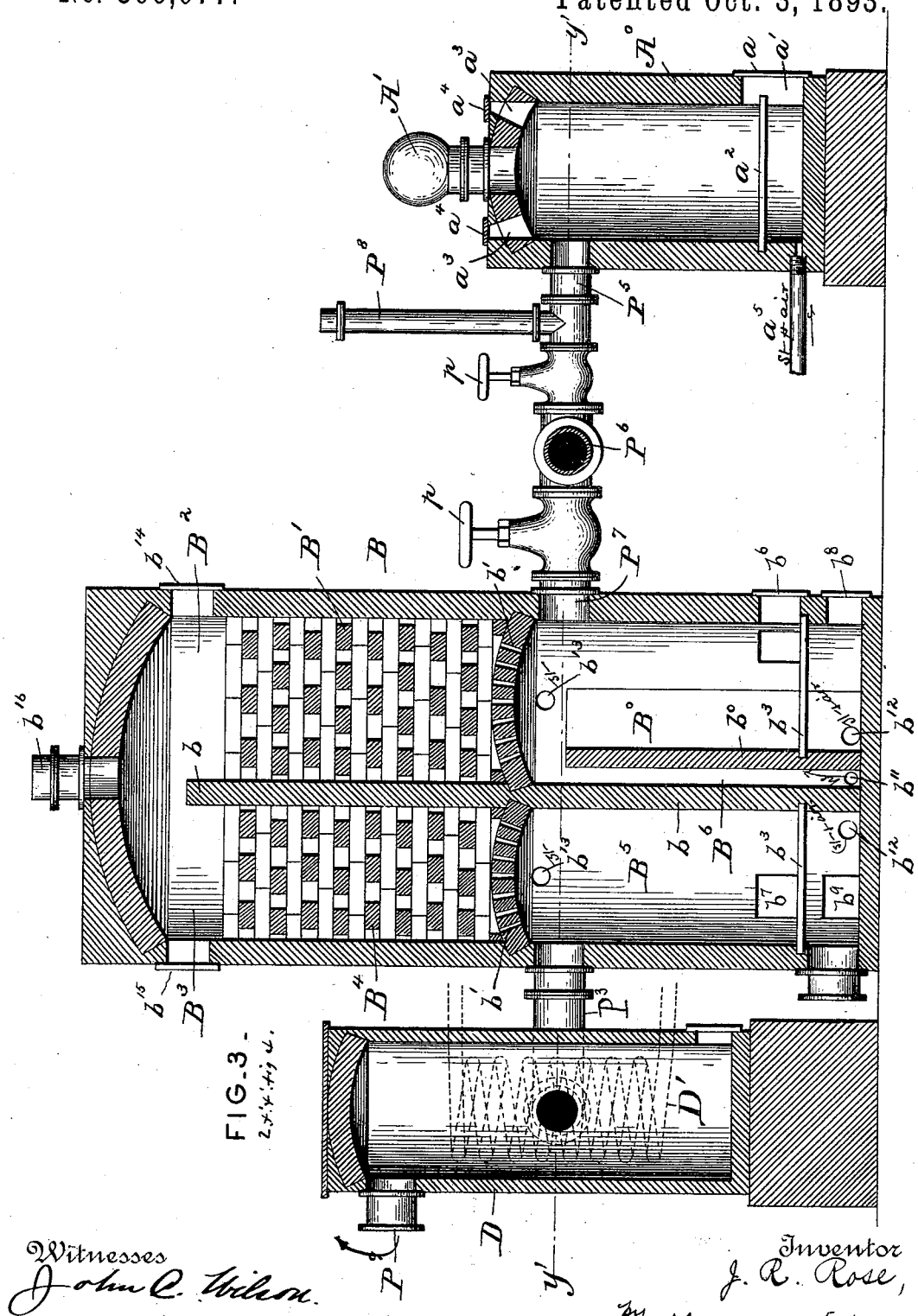

Figure 1 represents a sectional view of the apparatus along the line $x\ x$ of Fig. 2, looking to the right, parts being shown in elevation. Fig. 2 represents a section of the apparatus shown in Fig. 1 along the line $y\ y$ of the said figure, the pipes connecting the various parts being shown in plan. Fig. 3 represents a section of the device shown in Fig. 4, along the line $x'\ x'$ of the said figure, and represents a modification of the apparatus shown in Figs. 1 and 2. Fig. 4 represents a section along the line $y'\ y'$ of Fig. 3, the pipes connecting the various parts being shown in plan.

A represents one of a group of generators, in which any combustible fuel is used. $A^0$ in Figs. 3 and 4 represents a similar generator, there being four of the said generators represented in Figs. 1 and 2, and three in Figs. 3 and 4. The said generators are provided with doors $a$ for cleaning out the lower part of the furnace, apertures $a'$, grates $a^2$, of any desired type, pipes $a^5$ for admitting steam and air, and devices $A'$ for feeding the fuel into the generator. Poke holes $a^3$ and covers $a^4$, as shown in Fig. 3, may also be provided.

B represents one of a pair, or several pairs of combined generators, regenerators and fixers, provided with a central partition wall $b$, which divides the interior space into two semi-cylindrical chambers. These chambers are further divided by perforated arches $b'$, over which perforated arches a checker work or filling of refractory material is placed. By means of these arches, the combined generator, regenerator and fixer B is divided into four chambers, $B^0$, $B'$, $B^4$ and $B^5$; over the checkerwork in the chambers $B'$ and $B^4$ empty spaces $B^2$ and $B^3$ are left as shown in Figs. 1 and 3. These empty spaces or upper chambers $B^2$ and $B^3$ are provided with doors $b^{14}$ and $b^{15}$ for putting in the refractory material, and a relief cap $b^{16}$. The lower chamber $B^0$ is provided with a vertical wall $b^0$ a short distance away from the wall $b$, leaving between the two walls a chamber $B^6$ provided at its base with an inlet $b^{11}$ for the admission of any hydro-carbon. Each of the lower chambers $B^0$ and $B^5$ is provided with doors $b^4$ and $b^5$ and corresponding apertures for feeding fuel in on the grates $b^3$, and doors $b^6$ and $b^8$, and $b^6$ and $b^9$ for cleaning out the bottom of the furnace and the ash pit respectively.

$b^{12}$ and $b^{13}$ are pipes for the admission of steam and air.

D represents a steam superheater provided with steam coil $D'$.

The generators A in Figs. 1 and 2 are connected by pipes $P'$ to the main pipe P, which is connected to the branch pipe $P^2$ leading into the two generators B. Pipes $P^3$ connect the chambers $B^5$ with the pipes $P^4$ leading to the steam superheaters D from which the gas is carried by the pipe $P^9$ to the place of consumption, or to a suitable reservoir.

The generators $A^0$ shown in Figs. 3 and 4 are connected by the pipes $P^5$ to the pipe $P^6$, opening into the pipe $P^7$ communicating with the chambers $B^0$; these various pipes are provided with valves $p$, by which the generators may be cut out entirely, or the route of the gases may be changed, as will be hereinafter described.

The various generators A and $A^0$ are provided with relief caps $P^8$ which may be of any well known construction.

The operation of the device is as follows:—
The generators A or $A^0$ and the chambers $B^0$ are charged with coal or any fuel containing carbon, and the regenerators $B^5$ are charged with coke or hard coal. This fuel is ignited and is blasted to incandescence. The products of combustion from $B^0$ and $B^5$ pass up through the checker brick in $B'$ and $B^4$, heating them, and thence into the air by means of the relief cap $P^{16}$; the products of combustion from the fuel in generators A escape into the air by means of the relief cap $P^8$. This heating and allowing the products of combustion to escape into the air is only done on the inital heating up. As soon as the machine is closed up and the proper outlet for the escape of the gases opened, the manufacture of gas is continuous, hour by hour, day by day,—only one generator at a time being detached for the purpose of cleaning. Steam for the purpose of obtaining hydrogen, and air for the purpose of supporting combustion, are admitted simultaneously through the pipe $a^5$, and the resultant gases rising from above the incandescent fuel pass through the pipes connected to the generator and enter one of the chambers $B^0$. Entering this chamber above the fuel on the grate $b^3$, the gases mix with the hydrocarbon gases coming from the chamber $B^6$ and the gases arising from the fuel in $B^0$, and the mixture passes up through the perforated arch and highly heated refractory material $B'$, over the top of the walls $b$ down through the refractory material in $B^4$ into the chamber $B^5$. Thence, passing out through the pipe $P^3$, it reaches the steam superheater D, whence, by means of the pipe $P^9$ it is carried to the place of consumption. The gases from the coal generators pass over the incandescent fuel in the chamber $B^0$ and have part of their carbon di-oxide reconverted into monoxide; while in passing through the heated refractory material in the chambers $B'$ and $B^4$, the resultant gases become fixed. Then after leaving the chamber $B^4$ the gases pass over the incandescent coke in the chamber $B^5$ and most of the remaining carbon di-oxide present is converted into carbon monoxide. A pressure is maintained in the machine which does not permit of a suction of the gas from the regenerator. Hence the gas churns in every body of fuel and cannot escape without contact. Thence the gases go to the steam superheater where the hot gases superheat the steam used in the apparatus, which steam passes through the coil $D'$, and is conducted to the various generators by pipes, not shown. Each of the various generators being supplied with its own valve or valves, may be cut out from the apparatus, for purposes of cleaning and repairing, or for any other cause, without interfering with the continuous operation of the apparatus. Since the passage of steam through the generator and regenerator B will tend to bring down its temperature and since a high heat is required in fixing the gases, the generators B are preferably worked in pairs, one of each pair being used for regenerating and fixing the gases while the other is being heated up, and the products of combustion and the gases arising therefrom are mixed with the other gases from other generators. After passing the gases for a given time through one retort B, the course of the gases is changed by means of the admission valves, and the gas is then regenerated and fixed in the other generator and regenerator of the pair; while in the regenerating and fixing chamber which has just been running, air is admitted at the bottom and it is heated again for the next run.

In the process of heating up, the products of combustion from the generator $B^5$ are carried up through the refractory material in the chamber $B^4$, over the wall $b$, down through the refractory material in the chamber $B'$ and through the perforated arch $b'$, where they meet with the gases from the generator $B^0$, and hydrocarbon vapor from the chamber $B^6$. Thence they pass to the pipe leading to the other retort B, in which pipe the said products of combustion mingle with the gases from the various generators and the mixture enters the regenerating and fixing chamber, where the process of regeneration and fixing is carried out.

The gases from the generators A and $B^0$ are producer gases. When they meet with hydrocarbon vapor and become fixed in $B'$, $B^4$ and $B^5$ they are hydrocarbon gases of approximately the following composition: Hydrogen ten per cent.; marsh gas eight per cent.; carbon monoxide twenty per cent.; heavy hydrocarbons six per cent.; carbon dioxide 0.99 per cent.; oxygen .54 per cent.; nitrogen 54.47 per cent.

When the regenerator which is being heated up has reached the desired temperature, the heating up is stopped, and the gases to be regenerated and fixed are made to pass through that retort. By this process a continuous flow of gas is maintained. Should the retorts B get too hot, steam may be introduced through the pipes $b^{12}$ and $b^{13}$ which will bring down the temperature sufficiently. The air is supplied by a pressure, as also the steam.

It will be evident that by increasing the amount of steam introduced into the base of the generators A, the quantity of hydrogen set free may be increased, and hence a better fuel gas may be obtained; while by increasing the percentage of carbon, either by diminishing the amount of steam admitted, or by injecting a greater amount of hydrocarbon through the pipe at the base of the chamber $B^6$, an illuminating gas richer in carbon may be obtained. It will be seen that in this process a mixture of gases containing olefiant gas is carried from the various generators to a large pipe where the temperature is reduced and free hydrogen and carbon are evolved; then conducting this mixture into a highly heated chamber the carbon and hydrogen unite again to form marsh gas, and the carbon dioxide present is reduced to monoxide, whereby great heating effect is obtained.

It will be noted that the regenerating and fixing is done in the same retort B, which is heated internally by the fuel used in making the gas.

Having thus described my invention, what I claim, and desire to secure by Letters Patent of the United States, is—

1. In an apparatus for the manufacture of gas, the combination of a plurality of gas generators with closed outlets for conducting the gas therefrom, and independent valves for each generator controlling the said outlets, of a supply pipe connected to all of said outlets, a pair of combined generating, fixing, and regenerating chambers connected to said supply pipes independent of each other, and means for causing the gases from all the generators in operation and from one of these chambers to flow through the other of the said chambers substantially as and for the purposes described.

2. In an apparatus for the manufacture of gas, a combined generator, regenerator and fixer B, a central partition wall $b$ extending nearly to the top thereof, a generating chamber $B^0$ situated in the lower part of said combined generator, regenerator, and fixer, a gas inlet into said chamber $B^0$, a chamber $B^6$ for the admission of hydrocarbon adjacent to said generating chamber $B^0$; an inlet for the hydrocarbon; a regenerating chamber $B^5$ on the opposite side of said wall $b$ from said chamber $B^0$; a gas outlet therefrom; and fixing chambers $B'$ and $B^4$ over said chambers $B^0$ and $B^6$, substantially as and for the purposes described.

3. In an apparatus for the manufacture of gas, the combination of two combined generators, regenerators and fixers, each provided with a central partition wall $b$ extending nearly to the top thereof, a chamber $B^0$ situated in the lower part of said combined generator, regenerator, and fixer, a gas inlet, and an inlet for steam and air into said chamber $B^0$; a chamber $B^6$ adjacent to said generating chamber $B^0$, an inlet for the hydrocarbon into said chamber $B^6$; a chamber $B^5$ on the opposite side of said wall $b$ from said chamber $B^0$; a gas outlet therefrom, and an inlet for steam and air thereinto; fixing chambers $B'$ and $B^4$ over said chambers $B^0$ and $B^6$, and a pipe connecting said pair of chambers $B^0$, substantially as and for the purposes described.

In testimony whereof I affix my signature in presence of two witnesses.

JAMES REUBEN ROSE.

Witnesses:
Wm. L. Lapsly,
J. H. Nicholson.